(12) United States Patent
Sumida (10) Patent No.: US 11,139,531 B2
(45) Date of Patent: Oct. 5, 2021

(54) POWER STORAGE MODULE (71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Tatsuya Sumida, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 120 days.

(21) Appl. No.: 16/614,869

(22) PCT Filed: May 16, 2018

(86) PCT No.: PCT/JP2018/018857
§ 371 (c)(1),
(2) Date: Nov. 19, 2019

(87) PCT Pub. No.: WO2018/221214
PCT Pub. Date: Dec. 6, 2018

(65) Prior Publication Data
US 2021/0159565 A1 May 27, 2021

(30) Foreign Application Priority Data
Jun. 2, 2017 (JP) .............................. JP2017-109772

(51) Int. Cl.
*H01M 50/291* (2021.01)
*H01M 50/227* (2021.01)
(Continued)

(52) U.S. Cl.
CPC ....... *H01M 50/291* (2021.01); *H01M 50/213* (2021.01); *H01M 50/224* (2021.01);
(Continued)

(58) Field of Classification Search
CPC ............. H01M 50/224; H01M 50/227; H01M 50/238; H01M 50/242; H01M 50/249;
(Continued)

(56) References Cited

U.S. PATENT DOCUMENTS

2005/0054240 A1   3/2005   Kubota et al.
2010/0053927 A1   3/2010   Inoue et al.
(Continued)

FOREIGN PATENT DOCUMENTS

JP   2004-185867 A    7/2004
JP   2012-243689 A   12/2012
(Continued)

OTHER PUBLICATIONS

International Search Report, Application No. PCT/JP2018/018857, dated Aug. 7, 2018. ISA/Japan Patent Office.

*Primary Examiner* — Gregg Cantelmo
(74) *Attorney, Agent, or Firm* — Honigman LLP (57) ABSTRACT

Power storage modules and BM includes: a plurality of power storage elements; a circuit board that is configured to connect the power storage elements; a case that is made of a metal and is configured to house the power storage elements; and holding members and that are configured to hold the power storage elements, wherein the holding members include: the cap into which the power storage elements are to be fit; the fixing portion that is configured to be fixed to the case; and the resin elastic portion that is provided so as to be able to elastically expand and contract between the cap and the resin elastic portion, and is constituted by a resin.

5 Claims, 9 Drawing Sheets

(51) Int. Cl.
*H01M 50/284* (2021.01)
*H01M 50/507* (2021.01)
*H01M 50/242* (2021.01)
*H01M 50/517* (2021.01)
*H01M 50/224* (2021.01)
*H01M 50/249* (2021.01)
*H01M 50/213* (2021.01)
*H01M 50/238* (2021.01)
*H01M 50/293* (2021.01)

(52) U.S. Cl.
CPC ....... *H01M 50/227* (2021.01); *H01M 50/238* (2021.01); *H01M 50/242* (2021.01); *H01M 50/249* (2021.01); *H01M 50/284* (2021.01); *H01M 50/293* (2021.01); *H01M 50/507* (2021.01); *H01M 50/517* (2021.01)

(58) Field of Classification Search
CPC ............. H01M 50/284; H01M 50/291; H01M 50/293; H01M 50/507; H01M 50/517
See application file for complete search history.

(56) References Cited

U.S. PATENT DOCUMENTS

2011/0171505 A1* 7/2011 Kishll ................... H01M 50/20
                                                     429/82
2016/0336556 A1* 11/2016 Okutani .............. H01M 50/213

FOREIGN PATENT DOCUMENTS

| JP | 2012-248374 A | 12/2012 |
| JP | 2013-246991 A | 12/2013 |
| JP | 2016-072041 A | 5/2016 |

\* cited by examiner

POWER STORAGE MODULE

CROSS-REFERENCE TO RELATED APPLICATIONS

This application is the U.S. national stage of PCT/JP2018/018857 filed on May 16, 2018, which claims priority of Japanese Patent Application No. JP 2017-109772 filed on Jun. 2, 2017, the contents of which are incorporated herein.

TECHNICAL FIELD

The technique disclosed in the present specification relates to a power storage module.

BACKGROUND

The power source apparatus described in JP 2012-243689A is a currently known example of a power storage module in which a plurality of power storage elements are connected. In the technique described in JP 2012-243689A, a plurality of rectangular battery cells are housed in a cladding case, and bus bars are attached and electrically connected to electrode terminals of the rectangular battery cells. These bus bars have a wavy shape in which cuts are provided between connection holes into which the electrode terminals are inserted. Thus, even if the battery cells expand due to heat and the distance between the electrode terminals changes, this change is absorbed by the wave-shaped portions of the bus bar deforming, and thus the connection state of the battery cells is kept stable.

Also, JP 2013-246991A discloses a battery system in which a plurality of battery cells are fixed at predetermined positions with use of a fixing component, electrode terminals are connected by bus bars, and welding rings are mounted on the bus bars. The inner circumferential surfaces of the welding rings are laser welded to the electrode terminals and the outer circumferential surfaces of the welding rings are laser welded to the bus bars to fill the gaps between the electrode terminals and the bus bars, and thus a more reliable electrical connection is achieved.

However, it is difficult to reduce the cost of producing the bus bars in JP 2012-243689A as they need to be precisely machined into a predetermined wave-shape. Also, in JP 2013-246991A, the spaces between the electrode terminals and the bus bars are completely filled in by the welding rings and the electrode terminals and the bus bars are fixed through welding, and thus, when the battery cells expand due to heat and the distance between the electrode terminals changes, there is no room for this change to escape and there is a risk of an excessive load being placed on the electrode terminals.

The technique disclosed in the present specification was completed based on the circumstances described above, and it is an object thereof to eliminate dimensional differences that arise due to the tolerance and thermal expansion of the power storage elements in the power storage module, to make assembling the power storage module easy, and to reduce stress on the electrodes of the power storage module.

SUMMARY

A power storage module according to the technique disclosed in the present specification includes: a plurality of power storage elements; a connection conductor that is configured to connect the plurality of power storage elements; a case that is made of a metal and is configured to house the power storage elements; and a holding member that is configured to hold the power storage elements, wherein the holding member includes: a cap into which the power storage elements are to be fit; a fixing portion that is configured to be fixed to the case; and a resin elastic portion that is provided so as to be able to elastically expand and contract between the cap and the fixing portion, and is constituted by a resin.

With this configuration, the power storage elements are fixed to the case via the holding member, and thus it is possible to adjust the relative positions of the power storage elements and the case through the elastic expansion and contraction of the resin elastic portions that are provided on the holding member. Thus, when the power storage elements are fixed to the case, the dimensional errors of the power storage elements are absorbed and the task of fixing the power storage elements to the case can be easily performed without putting strain on the places where the electrodes and the connection conductor are connected. Also, even if dimensional differences occur between the holding member and the metal case due to differences in the thermal expansion coefficients thereof, those dimensional differences can be absorbed by the elastic expansion and contraction of the resin elastic portions.

The following configuration is preferable as an embodiment pertaining to the technique disclosed in the present specification.

The resin elastic portions are arranged on at least one end side in the lengthwise direction of the holding member.

The holding member is prone to accumulating dimensional differences and increasing in size due to differences in the thermal expansion coefficients of the synthetic resin holding member and the metal case, but with this configuration the resin elastic portions that can expand and contract are arranged on at least one end portion side in the lengthwise direction of the holding member, and therefore the dimensional differences can be effectively absorbed.

Each of the power storage elements includes: an electrode that is configured to be fixed to the connection conductor; and a power storage element body that is configured to be housed in the case; the cap is arranged between the power storage element bodies and the connection conductor, and elastic parts configured to bias the power storage element bodies toward the cap are provided in the case.

With this configuration, the electrodes of the power storage elements are fixed to the connection conductor, the cap is arranged between the connection conductor and the power storage element bodies, and the power storage element bodies are biased towards the cap by the elastic parts, and therefore the power storage element bodies are held between the cap and the elastic parts such that there is no stress on the electrodes.

The cap is provided with conductor receiving portions against which the connection conductor can abut.

With this configuration, the conductor receiving portions of the cap can abut the connection conductor, and therefore it is possible to disperse the pressing force from the connection conductor that is received by the electrodes and reduce the stress on the electrodes.

Advantageous Effects of Invention

With the power storage module pertaining to the technique disclosed in the present specification, it is possible to eliminate dimensional differences caused by the tolerance and thermal expansion of the power storage elements in the power storage module, to make assembling the power storage module easy, and to reduce stress on electrodes of the power storage module.

DETAILED DESCRIPTION OF PREFERRED EMBODIMENTS

First Embodiment

A first embodiment pertaining to the technique disclosed in the present specification will be described with reference to FIGS. 1 to 7. Note that the following description will be given with reference to three directions as shown in the drawings, where the X direction is the rightward direction, the Y direction is the forward direction, and the Z direction is the upward direction. Also, if there is a plurality of identified members in the following description, reference numerals will be assigned to only one member, and reference numerals will not be assigned to the other members in some cases.

Figure 1:
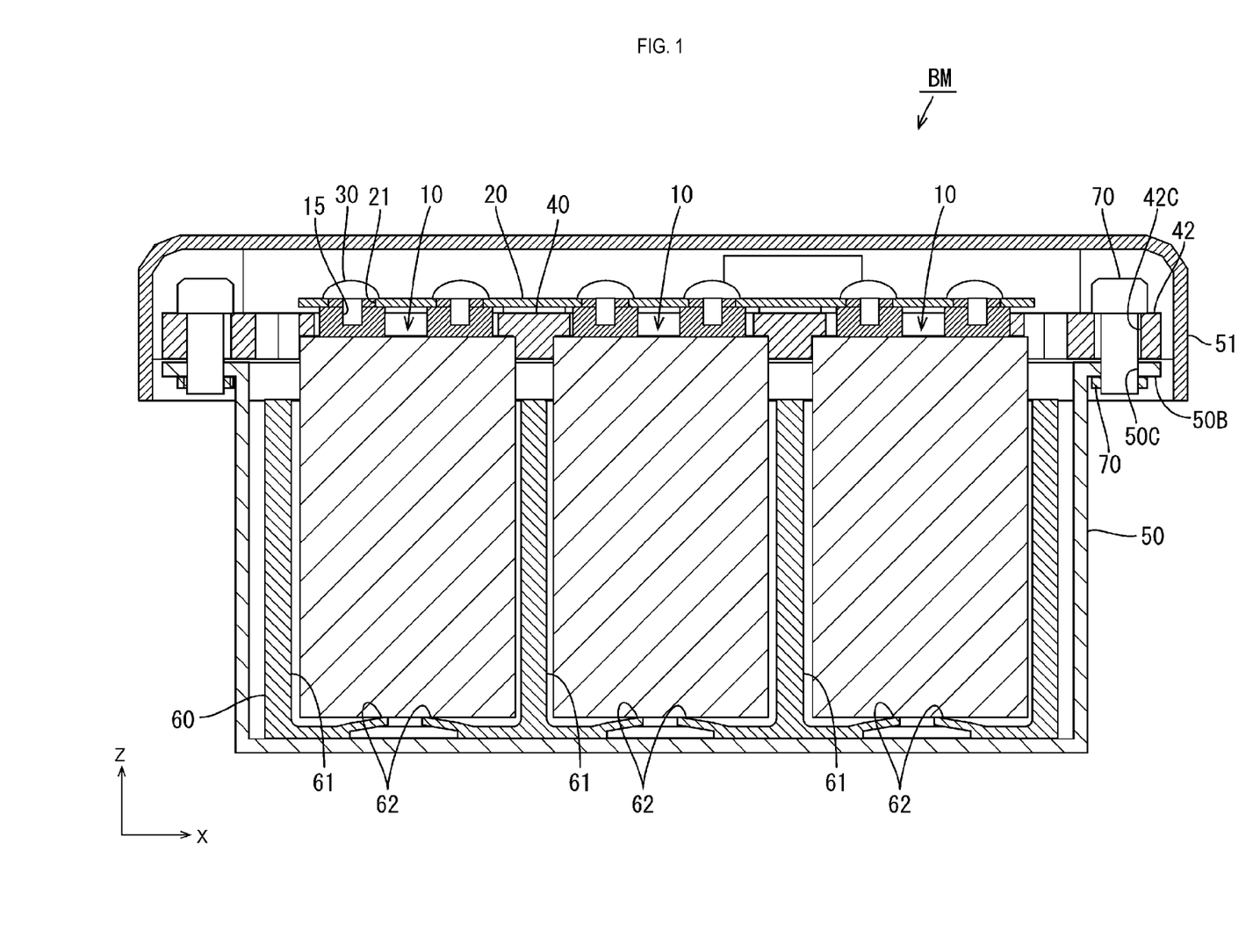
FIG. 1 is a longitudinal sectional diagram showing a power storage module according to a first embodiment.
Figure 2:
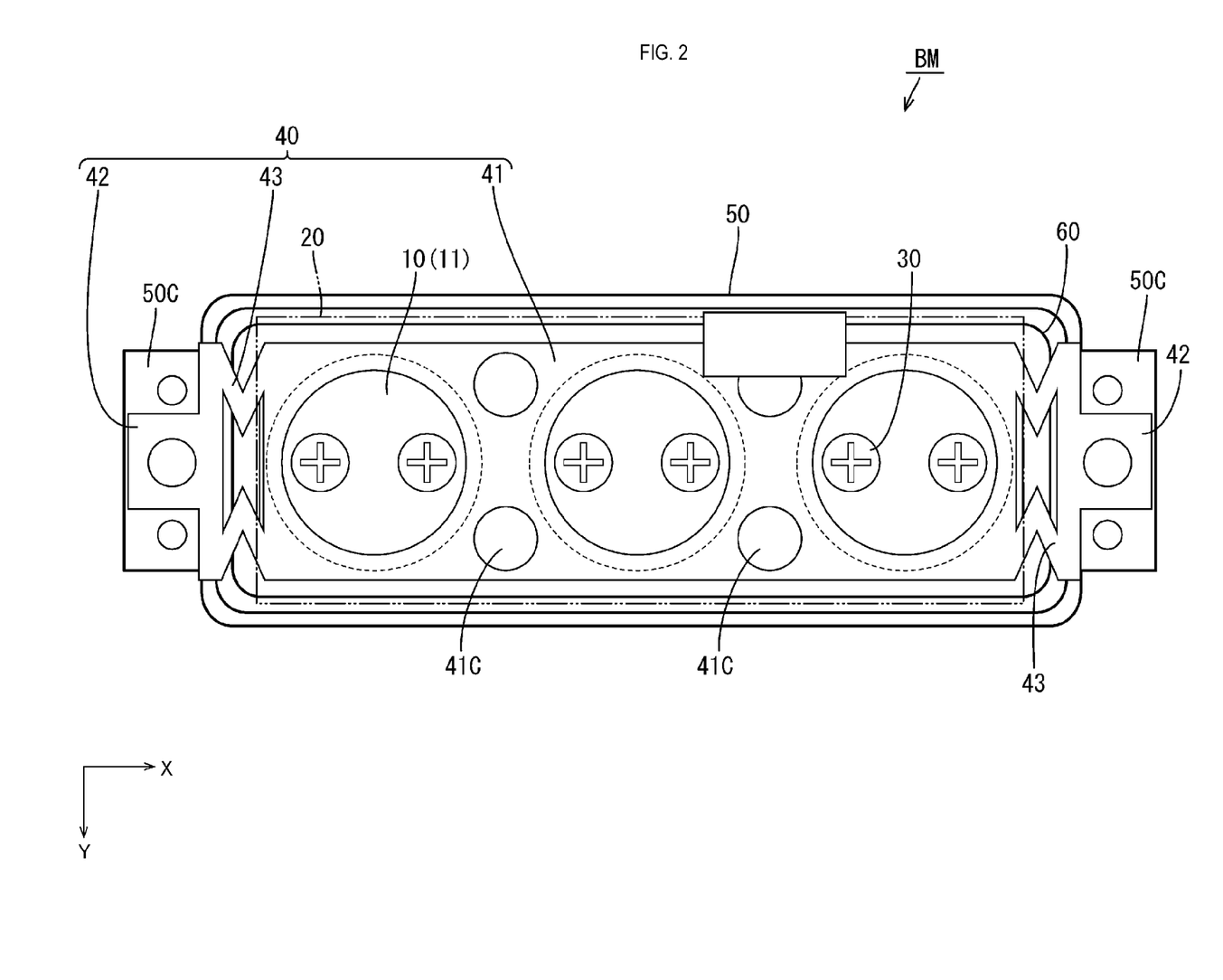
FIG. 2 is a top view of the power storage module.

A power storage module BM of the present embodiment is to be installed in a vehicle as a sub power source that is provided separately from a main power source. As shown in FIG. 1, the power storage module BM includes a plurality (three in the present embodiment) of power storage elements 10, a circuit board (which is an example of a connection conductor), a holding member 40, a case 50, and a holder 60. The power storage elements 10 and the circuit board 20 are fixed together as a single body by screws 30, are housed in the case 50, and are fixed to the case 50 via the holding member 40, which is placed on the power storage elements 10. The holder 60 is arranged in the case 50, and surrounds the power storage elements 10. A case cover 51 is placed over the case 50.

Figure 3:
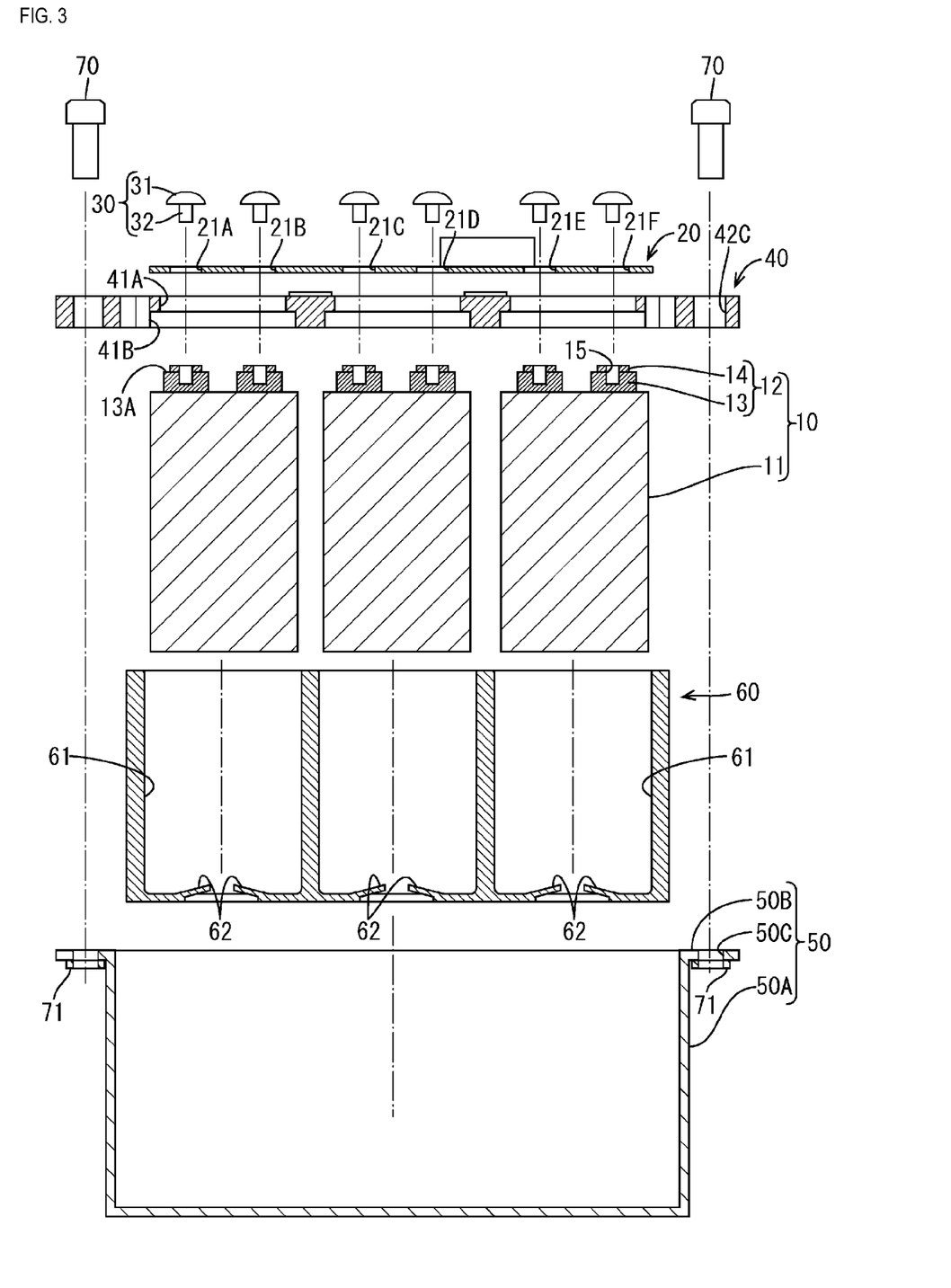
FIG. 3 is an exploded sectional view of the power storage module.

As shown in FIG. 3, each power storage element 10 includes a cylindrical power storage element body 11 (which is an example of a power storage element body), and a pair of electrodes 12 that protrude from the upper surface of the power storage element body 11. The electrodes 12 are integrally formed into shapes in which a cylindrical base portion 13 and a spacer portion 14, which has a smaller diameter than the base portion 13, are layered in the up-down direction with their axial centers aligned. The upper surfaces of the base portions 13 serve as electrode shoulder portions 13A for supporting the circuit board 20, which will be described later. Screwing portions 15 that are open in the upward direction are formed in the electrodes 12. Note that the upper surfaces of the power storage element bodies 11 serve as body shoulder portions 11A that abut against abutting surfaces 44 of the holding member 40, which will be described later.

The circuit board 20 is a flat plate-shaped layered substrate that has the same height as, or is slightly thicker than, the spacer portions 14 of the electrodes 12. The circuit board 20 includes six through holes 21 (21A to 21F), power patterns 22 for enabling conduction between the plurality of through holes 21, and is mounted on the above-described electrode shoulder portions 13A. Note that "through holes 21" will be written when giving a description without distinguishing between the through holes 21A to 21F.

Each of the through holes 21 has an oval shape that is longer in the left-right direction, and the shorter axis thereof is slightly larger than the diameter of the spacer portion 14, and smaller than the diameter of the base portion 13 of the electrode 12 of the power storage element 10. The spacer portions 14 of the electrodes 12 are inserted into the through holes 21, and the screws 30 are screwed into the screwing portions 15. Thus, the electrodes 12 are fixed to the circuit board 20. The screws 30 are commonly known screws and each include, as a single body, a head portion 31 and a shaft portion 32. The shaft portions 32 of the screws 30 are inserted and screwed into the screwing portions 15 of the electrodes 12, and the head portions 31 of the screws 30 abut against the upper surface of the circuit board 20, which is thus pressed against the base portions 13 of the electrodes 12. The head portions 31 also abut against the upper surfaces of the spacer portions 14 of the electrodes 12 and are supported thereby.

Figure 4:
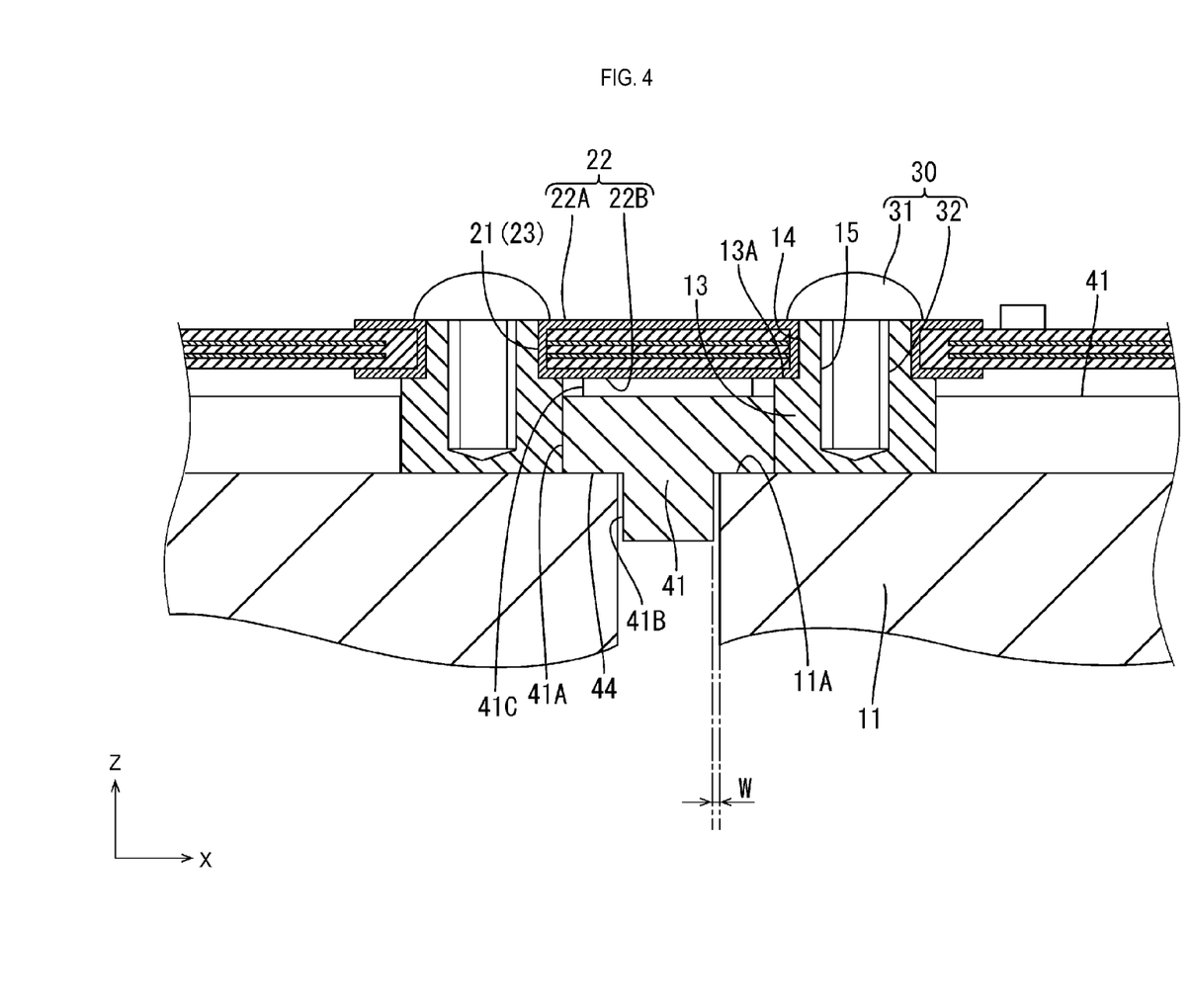
FIG. 4 is a longitudinal sectional diagram of the power storage module.

The power patterns 22 are formed surrounding the plurality of through holes 21. In the present embodiment, the power patterns 22 are formed surrounding the two through holes 21B and 21C, as well as 21D and 21E, into which the anodes and cathodes of adjacent power storage elements 10 are inserted. As shown in FIG. 4, the power patterns 22 are made from two pattern layers 22A and 22B, wherein the lower pattern layers 22B are exposed to the lower surface of the circuit board 20. Also, plating layers 23 are formed on the inner walls of the through holes 21 and are continuous with the pattern layers 22A and 22B. Thus, the plating layers 23 and the pattern layers 22A and 22B together form one connection conductor. In a state in which the circuit board 20 is mounted on the electrodes 12 (the electrode shoulder portions 13A of the base portions 13), the electrodes 12 are in contact with the lower pattern layers 22B and are electrically connected by the whole connection conductor.

Thus, at the electrodes 12, the power storage elements 10 are electrically connected by the power patterns 22 that are formed in the circuit board 20, and are fixed as a single body to the circuit board 20.

Figure 5:
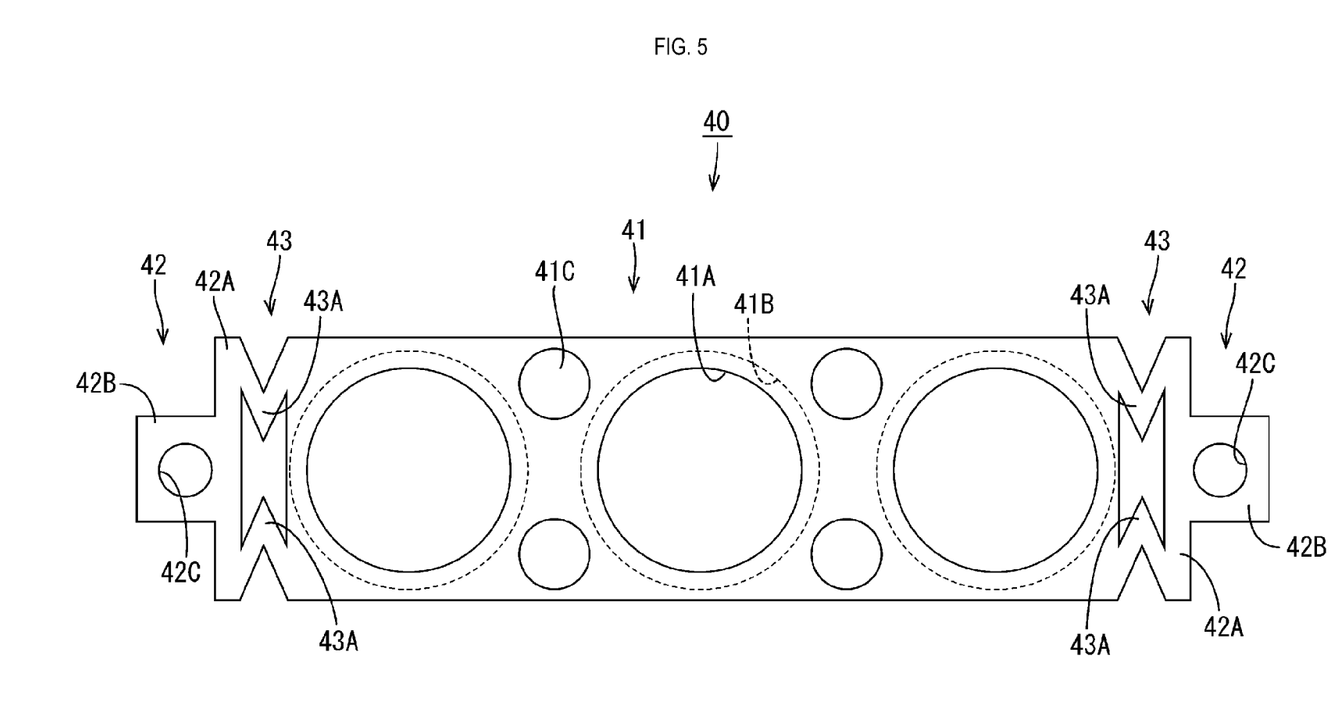
FIG. 5 is a top view of a holding member.
Figure 6:
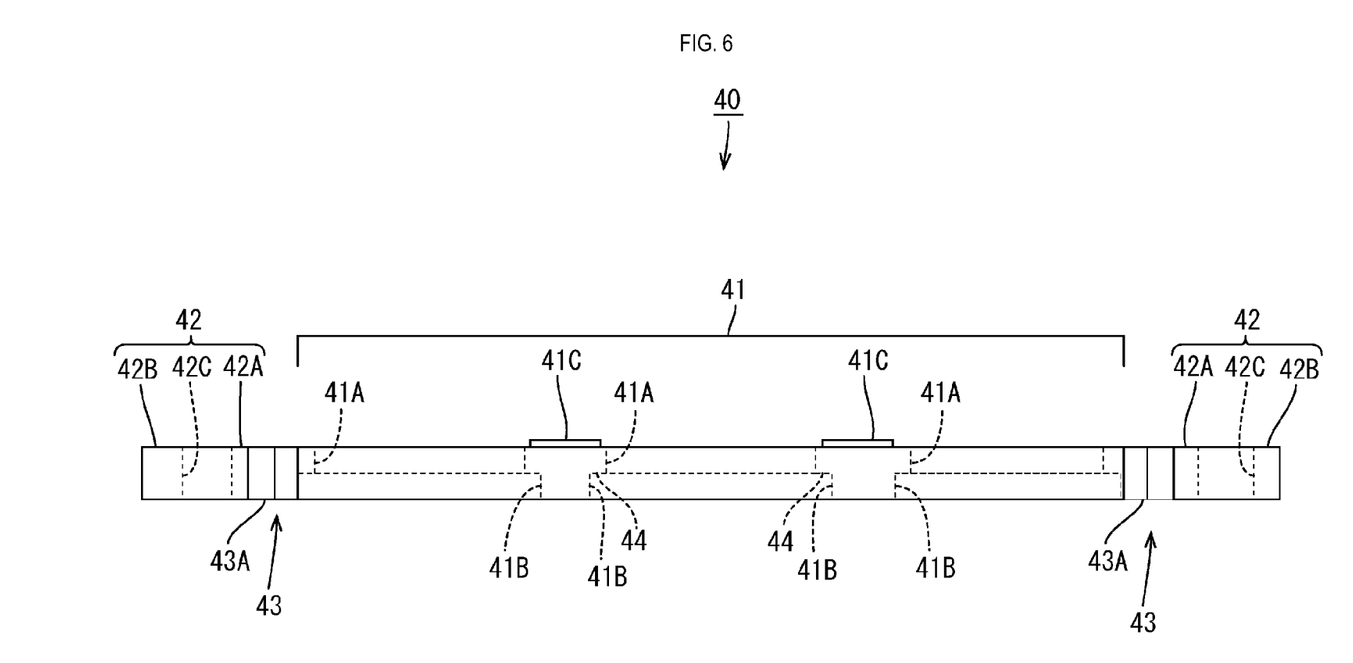
FIG. 6 is a front view of the holding member.

The holding member 40 is made of an insulating material containing a resin and, as shown in FIGS. 5 and 6, includes a cap 41, fixing portions 42, and resin elastic portions 43. Note that holding member 40 of the present embodiment is formed into a substantially flat-plate shape by pouring PBT (polybutylene terephthalate) including glass fibers into a mold in the left-right direction (lengthwise direction) thereof. Thus, since the glass fibers are aligned in the lengthwise direction of the mold, thermal expansion of the holding member 40 is reduced in the lengthwise direction.

The cap 41 of the holding member 40 has a substantially flat-plate shape, and includes three outer fitting recessed portions 41B that are open in the downward direction, and three insertion holes 41A that are open in the up-down direction. The outer fitting recessed portions 41B each have a circular shape in a cross-sectional view, and each have a diameter that is slightly larger than the diameter of the power storage element body 11, and slightly smaller than one side of the housing recessed portion of a housing recessed portion 61 that is provided in the holder 60, which will be described later. The top faces of the outer fitting recessed portions 41B serve as the abutting surfaces 44 against which the body shoulder portions 11A of the power storage elements 10 abut. The insertion holes 41A each have a circular shape in a cross-sectional view, and each have a smaller diameter than the outer fitting recessed portion 41B. The insertion holes 41A are arranged coaxially with the outer fitting recessed portions 41B, and are continuous with the internal spaces of the outer fitting recessed portions 41B. Also, a plurality of flat, cylindrical board receiving portions 41C (which are examples of conductor receiving portions) are provided protruding from the upper surface of the cap 41. The board receiving portions 41C are arranged between the insertion holes 41A, with one board receiving portion 41C being arranged frontward, and the other being arranged rearward.

As shown in FIG. 4, the cap 41 is provided between the power storage element body 11 and the circuit board 20. The upper ends of the power storage element bodies 11 are fitted to the outer fitting recessed portions 41B, and the body shoulder portions 11A abut against the abutting surfaces 44. Clearances W are provided between the peripheral surfaces of the power storage element bodies 11 and the inner peripheral walls of the outer fitting recessed portions 41B. The base portions 13 of the electrodes 12 are inserted into the insertion holes 41A.

The fixing portions 42 of the holding member 40 are formed on both the left and right ends of the holding member 40. The fixing portions 42 include wide portions 42A that are elongated front-rear, and extending portions 42B that are formed projecting toward the sides from the centers in the front-rear direction of the wide portions 42A. Fixing holes 42C are provided passing through the centers of the extending portions 42B.

The resin elastic portions 43 of the holding member 40 are constituted by four leaf-spring parts 43A that have a bellows-shape and can expand and contract in the same plane as the cap 41. The leaf-spring parts 43A are provided such that the front end portions and the rear end portions of both side ends of the cap 41, are respectively joined to the front end portions and the rear end portions of the side ends on the cap 41 sides of the wide portions 42A of the fixing portions 42. In the present embodiment, the leaf-spring parts 43A are shaped like the letter "V" when viewed from above, and the vertical thickness thereof is similar to that of the cap 41. Thus, the resin elastic portions 43 elastically expand and contract between the cap 41 and the fixing portions 42, and hold the cap 41 between the fixing portions 42 such that it can be displaced in the left-right direction.

As shown in FIG. 3, the case 50 includes a hollow rectangular parallelepiped shaped case body 50A that is open in the upward direction, and tab portions 50B. The tab portions 50B are formed projecting laterally from the upper edges of the side surfaces of the case body 50A. Bolt insertion holes 50C are provided in the center of the tab portions 50B.

As shown in FIG. 1, the fixing portions 42 and the fixing holes 42C of the holding member 40 are arranged layered on the tab portions 50B and the bolt insertion holes 50C, respectively. Bolts 70 are inserted from above into the fixing holes 42C and the bolt insertion holes 50C, and the bolts 70 are screwed into nuts 71 that are provided on the lower surface sides of the bolt insertion holes 50C. Thus, the cap 41 of the holding member 40 is fixed to the case 50 by the fixing portions 42 via the resin elastic portions 43.

Figure 7:
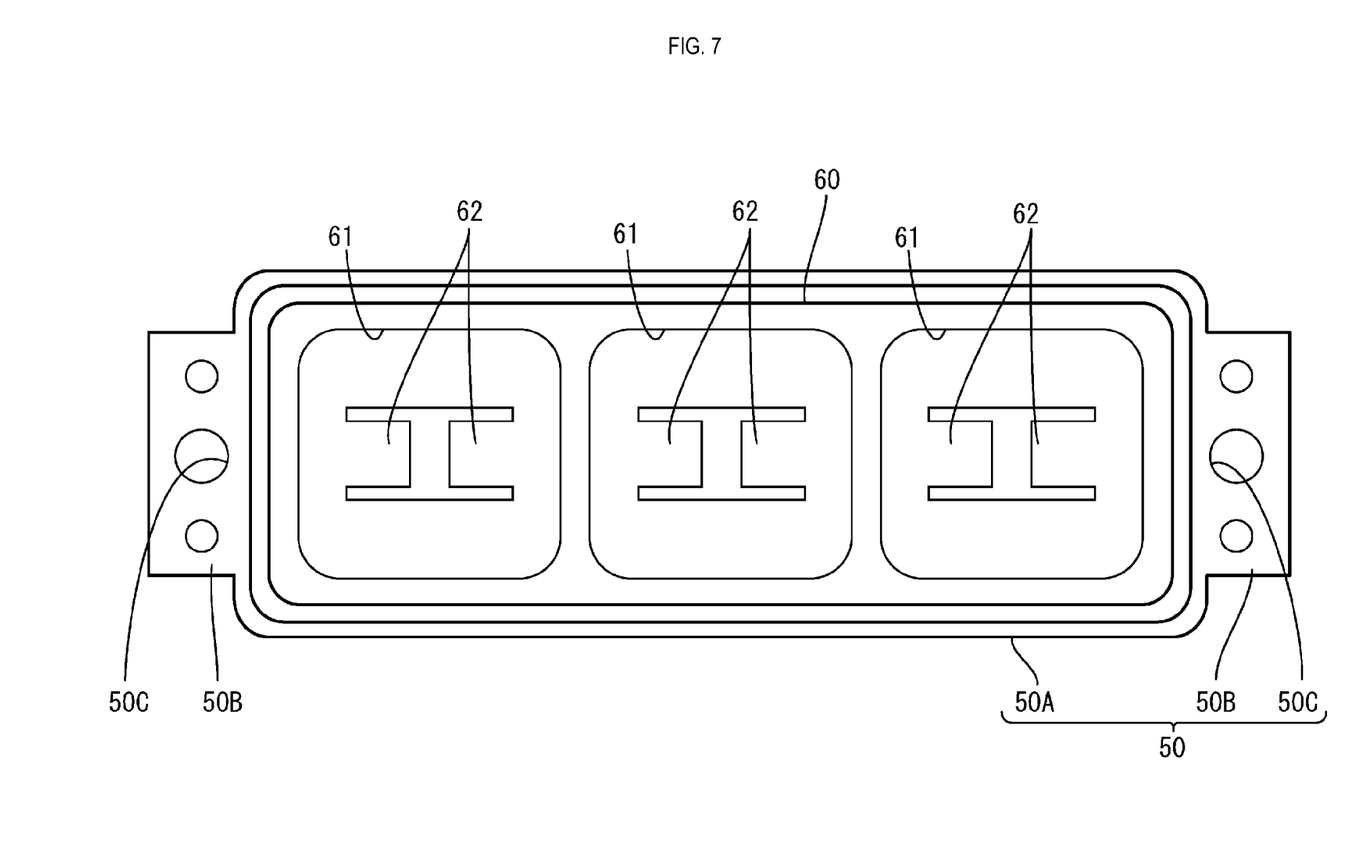
FIG. 7 is a top view of a metal case and a holder.

The holder 60 is made of an insulating material containing a resin, and is housed in the case body 50A. The holder 60 may also be fixed to the case body 50A with use of a known means such as fastening with a screw, adhesion, or the like. Three housing recessed portions 61 are formed side-by-side left-right direction in the holder 60. As shown in FIG. 7, the housing recessed portions 61 have a rectangular tube shape, are open in the upward direction, and have substantially rectangular cross-sections. A clearance is provided between the holder 60 and the inner wall of the case body 50A, along the entire periphery of the inner wall of the case body 50A.

Elastic parts 62 are formed in the centers of the bottom surfaces of the housing recessed portions 61. A shown in FIG. 7, the elastic parts 62 of the present embodiment are constituted by two tab parts that are formed by portions of the bottom surfaces of the housing recessed portions 61 being cut and raised. As shown in FIG. 3, the tab parts protrude diagonally upward from the bottom surfaces of the housing recessed portions 61, with the outer sides of the elastic parts 62 in the left-right direction serving as the base ends.

As shown in FIG. 1, in a state in which the power storage elements 10 are housed in the case 50, the power storage element bodies 11 abut against the abutting surfaces 44 of the holding member 40 and the upward displacement thereof is thus restricted, and the power storage element bodies 11 are supported (that is to say, the storage element bodies 11 are sandwiched by the holding member 40 and the elastic parts 62) on their lower sides by the elastic parts 62, and thus a state is maintained in which the power storage element bodies 11 are raised above the bottom surface of the housing recessed portions 61. Note that the power storage element bodies 11 have dimensional errors, but those dimensional errors are absorbed by the elastic parts 62 individually elastically deforming so that the lower end positions of the power storage element bodies 11 are set to different height levels. Also, horizontal displacement the upper ends of the power storage element bodies 11 is restricted by the outer fitting recessed portions 41B of the cap 41, and thus an adequate amount of clearance is reserved between the inner peripheral walls of the housing recessed portions 61. The circuit board 20 is supported by the base portions 13 of the electrodes 12 and the board receiving portions 41C of the holding member 40 (the cap 41), and upward displacement of the circuit board 20 is restricted by the screws 30 that are screwed to the electrodes 12.

The following describes an example of a procedure for assembling the power storage module BM.

First, three power storage elements 10 are arranged side by side facing the same direction such that the cathodes and anodes thereof are alternatingly arranged side by side. Then, the cap 41 of the holding member 40 is fitted over the top ends of the power storage element bodies 11, and is thus mounted on the body shoulder portions 11A. The circuit board 20 is then placed on the cap 41, and the spacer portions 14 that protrude from the insertion holes 41A of the cap 41 are inserted into the through holes 21 and the circuit board 20 is mounted on the base portions 13. The screws 30 are then inserted and screwed into the screwing portions 15 of the electrodes 12 (spacer portions 14), and the power storage elements 10 and the circuit board 20 are thus fixed as single body.

Then, the power storage elements 10 and the circuit board 20 are both lifted together, and the power storage element bodies 11 are inserted into the housing recessed portions 61 of the holder 60 that is arranged in the case 50. In doing so, the power storage element bodies 11 are supported by the leading ends of the elastic parts 62, and a state is maintained in which the power storage element bodies 11 are raised above the bottom surfaces of the housing recessed portions 61.

Lastly, the resin elastic portions 43 of the holding member 40 are elastically expanded and contracted toward the sides as appropriate, the fixing holes 42C are aligned with the insertion holes 50C of the case 50, the bolts 70 are inserted into the fixing holes 42C and the bolt insertion holes 50C from above, and the bolts 70 are screwed into the nuts 71 that are arranged below the bolt insertion holes 50C. In doing so, the fixing portions 42 of the holding member 40 are pulled toward the tab portions 50B of the case 50 as the screwing progresses. Accordingly, the power storage elements 10 and the circuit board 20 that is fixed as a single body to the power storage elements 10 are pressed downwards, and the power storage element bodies 11 elastically deform the elastic parts 62 as they approach the bottom surface of the housing recessed portions 61. Then, once the screwing is complete and the holding member 40 is fixed to the case 50, the power storage module BM is obtained in which the power storage element bodies 11 are separated from the inner peripheral walls of the housing recessed portions 61 and are housed in the case 50, in a state in which the power storage element bodies 11 are biased upward (that is to say, toward the cap 41) by the elastic parts 62 and upward displacement thereof is restricted by the cap 41.

Note that the assembly procedure is not limited to the above description and, for example, an assembly procedure is also possible in which the power storage elements 10 are first inserted into the housing recessed portions 61 that are arranged in the case 50, and the storage elements 10 are mounted on the elastic parts 62, whereafter the holding member 40 and the circuit board 20 are placed thereon in the stated order and the screws 30 are screwed into the electrodes 12, and lastly, the holding member 40 is fixed to the case 50.

In this way, the power storage module BM according to the present embodiment includes: the plurality of power storage elements 10; the circuit board 20 that is configured to connect the power storage elements 10; the case 50 that is made of a metal and is configured to house the power storage elements 10; and the holding member 40 that is configured to hold the power storage elements 10, wherein the holding member 40 includes: the cap 41 into which the power storage elements 10 are to be fit; the fixing portion 42 that is configured to be fixed to the case 50; and the resin elastic portion 43 that is provided so as to be able to elastically expand and contract between the cap 41 and the resin elastic portion 43, and is constituted by a resin.

With this configuration, the power storage elements 10 are fixed to the case 50 via the holding member 40, and therefore it is possible to adjust the relative positions of the power storage elements 10 and the case 50 through the elastic expansion and contraction of the resin elastic portions 43. Thus, when the power storage elements 10 are fixed to the case 50, the dimensional errors of the power storage elements 10 can be absorbed, and the task of fixing the power storage elements 10 to the case 50 can be easily performed without applying stress to the places where the electrodes 12 and the circuit board 20 are connected. Also, even if a dimensional difference occurs between the synthetic resin holding member 40 and the metal case 50 due to the difference between the thermal expansion coefficients thereof, the thermal expansion can be absorbed by the elastic expansion and contraction of the resin elastic portions 43.

Also, the holding member 40 is prone to accumulating dimensional differences and increasing in size due to differences in the thermal expansion coefficients of the synthetic resin holding member 40 and the metal case 50, but with this configuration, the resin elastic portions 43 that can elastically expand and contract are arranged on at least one end portion side in the lengthwise direction of the holding member 40, and therefore the dimensional differences can be effectively absorbed.

Also, the power storage elements 10 are individually biased towards the cap 41 by the elastic parts 62, and therefore the power storage elements 10 can be held between the elastic parts 62 and the cap 41 regardless of any dimensional changes resulting from to dimensional errors, thermal expansion, and the like of the power storage elements 10. Also, the electrodes 12 of the power storage elements 10 are connected to the circuit board 20 and the power storage element bodies 11 are sandwiched between the cap 41 and the elastic parts 62, and therefore the power storage elements 10 can be held without applying stress to the electrodes 12.

Also, the cap 41 is provided with the board receiving portions 41C onto which the circuit board 20 can abut, and therefore it is possible to disperse the pressing force received by the electrodes 12 from the circuit board 20, and thus reduce the stress on the circuit board 20 and the electrodes 12. In particular, in a configuration in which the screws 30 are screwed into the electrodes 12 such as those of the present embodiment, it is possible to suppress the case in which the fastening force of the screws 30 concentrates in the places where the circuit board 20 and the electrodes 12 abut each other.

Also, the electrodes 12 of the power storage elements 10 are fixed to the circuit board 20, but the power storage element bodies 11 are separated from the inner peripheral walls of the housing recessed portions 61 along the entire periphery thereof, and are housed in the housing recessed portions 61 in a state of being supported by the elastic parts 62 that can elastically deform. Accordingly, even if the internal pressure of the power storage element bodies 11 rises due to heat or the like and the power storage element bodies 11 thus expand, it is possible for the power storage element bodies 11 to expand in the internal space of the housing recessed portions 61 while the elastic parts 62 elastically deform downward, centered about the parts of the electrodes 12 and the circuit board 20 that are fixed to each other.

Second Embodiment

Figure 8:
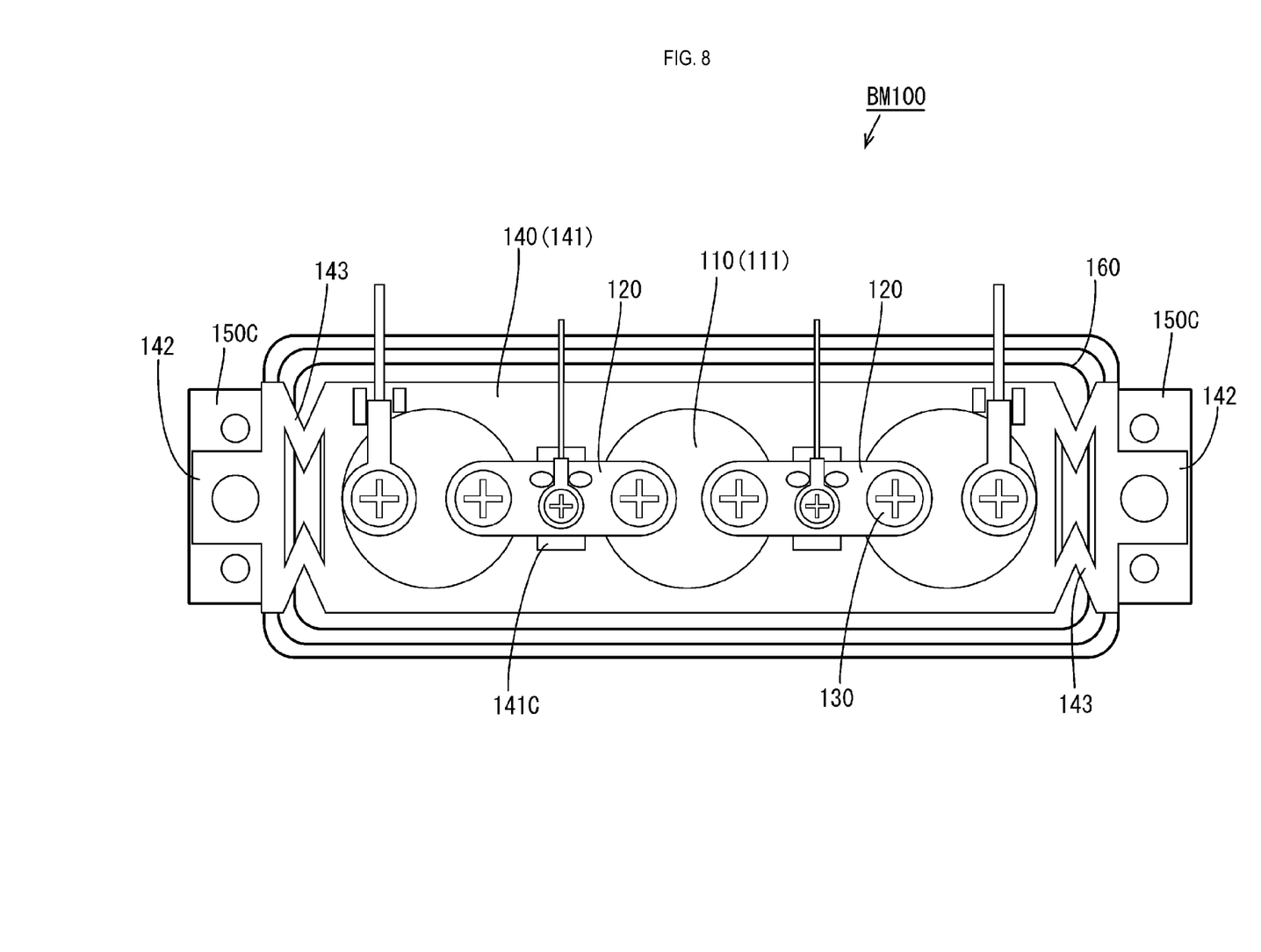
FIG. 8 is a top view showing the power storage module according to a second embodiment.
Figure 9:
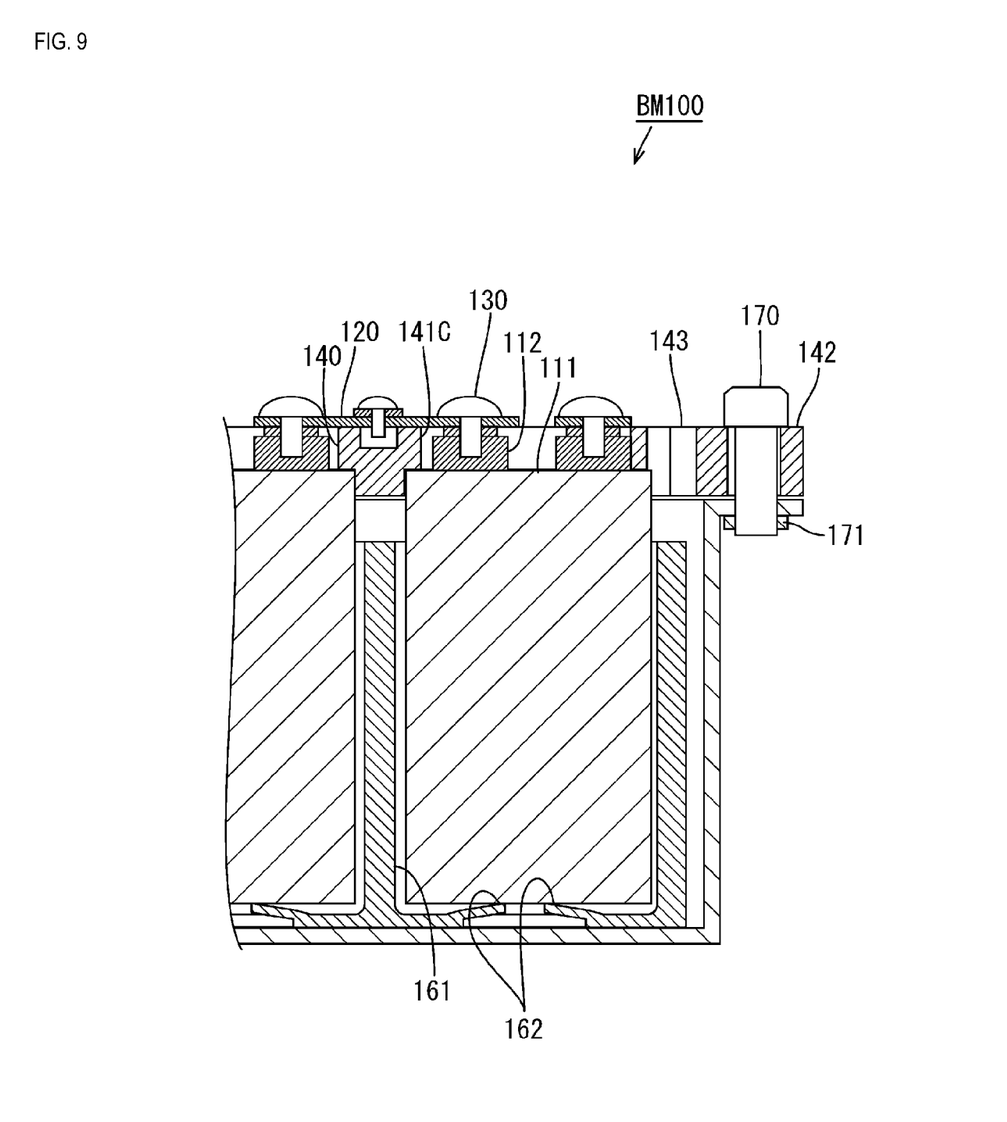
FIG. 9 is a longitudinal sectional diagram of the power storage module.

Next, a second embodiment pertaining to the technique disclosed in the present specification will be described with reference to FIGS. 8 and 9.

In a power storage module BM 100 of the present embodiment, power storage elements 110 are electrically connected by a plurality of bus bars 120 (which are an example of connection conductors) instead of the circuit board 20. A holding member 140 is provided with bus bar positioning portions 141C (which are examples of conductor receiving portions) instead of the board receiving portions 41C, and the bus bars 120 are mounted on the nus bar holding portions 141C. Other configurations are similar to those of the first embodiment, and therefore, unless explicitly stated, reference numerals used in the first embodiment will have 100 added thereto, and descriptions thereof shall be omitted.

OTHER EMBODIMENTS

The technique disclosed in the present specification is not limited to the embodiments described above with reference to the drawings, and can be implemented in the following modes, for example.

In the embodiments described above, the holding member 40 is provided with a number of insertion holes 41A corresponding to the number of the power storage elements 10, and three outer fitting recessed portions 41B, but a configuration is also possible in which, instead of being provided with the insertion holes 41A and three outer fitting recessed portions 41B, the holding member 40 is provided with a number of insertion holes corresponding to the number of electrodes 12, and the electrodes may be inserted therein. In this case, the connection conductors are supported by the insertion holes in the vicinity of the parts of the connection conductors that are fixed to electrodes, and therefore it is possible to further reduce stress on the parts of the connection conductors and the electrodes that are connected to each other.

The pair of tab parts in the embodiments described above are raised from the bottom surface of the housing recessed portions 161 as the elastic parts 62, but there is no limitation to the elastic parts and a configuration is also possible in which, for example, two flat springs are formed at positions on both sides of the shaft on the inner side walls of the housing recessed portions, and these flat springs may also protrude upward, or alternatively, insulating coil springs may be employed and arranged on the bottom surfaces of the housing recessed portions with their axial centers upright. In short, it is sufficient to bias the power storage element bodies toward the cap in a state in which the power storage element bodies are insulated from the case. Also, the elastic parts may be omitted if it is possible to reliably maintain the electrical connection in a state in which the electrodes are firmly fixed to the bus bars through laser welding and the like and the power storage elements are suspended from the bus bars.

In the embodiments described above, there are three power storage elements 10, but there is no limitation to the number thereof and there may be, for example, only one power storage element 10. Also in the embodiments described above, the power storage elements 10 are connected in series, but a configuration is also possible in which, for example, the power storage elements are connected in parallel.

In the first embodiment described above, the board receiving portions 41C have a flat cylindrical shape, but there is no limitation to the shape of the board receiving portions and, for example, multiple thin pin-shaped board receiving portions that protrude toward the circuit board may also be provided. The board receiving portions may also be omitted if the pressing force from below can be suppressed to within a predetermined range.

In the embodiments described above, the whole holding member 40 is made of PBT including glass fibers, but the holding member 40 may also be made of another resin material. A configuration is also possible in which the resin elastic portions 43 of the holding member 40 are made of a resin, and either or both of the cap 41 and the fixing portions 42 are made of a material other than a resin.

The invention claimed is:

1. A power storage module comprising:
   a plurality of power storage elements;
   a connection conductor that is configured to connect the plurality of power storage elements;
   a case that is made of a metal and is configured to house the power storage elements; and
   a holding member that is configured to hold the power storage elements,
   wherein the holding member includes:
   a cap into which the power storage elements are to be fit;
   a fixing portion that is configured to be fixed to the case; and
   a resin elastic portion that is provided so as to be able to elastically expand and contract between the cap and the fixing portion, and is constituted by a resin.

2. The power storage module according to claim 1, wherein the resin elastic portion is arranged on at least one end side in a lengthwise direction of the holding member.

3. The power storage module according to claim 1, wherein each of the power storage elements includes;
   an electrode that is configured to be fixed to the connection conductor; and
   a power storage element body that is configured to be housed in the case,
   the cap is arranged between the power storage element bodies and the connection conductor, and
   elastic parts configured to bias the power storage element bodies toward the cap are provided in the case.

4. The power storage module according to claim 3, wherein the cap is provided with conductor receiving portions against which the connection conductor can abut.

5. The power storage module according to claim 2, wherein each of the power storage elements includes:
   an electrode that is configured to be fixed to the connection conductor; and
   a power storage element body that is configured to be housed in the case,
   the cap is arranged between the power storage element bodies and the connection conductor, and
   elastic parts configured to bias the power storage element bodies toward the cap are provided in the case.

* * * * *